United States Patent [19]
Wech

[11] 3,779,838
[45] Dec. 18, 1973

[54] HEAT SEALING HEAD

[75] Inventor: Robert J. Wech, Green Bay, Wis.

[73] Assignee: FMC Corporaton, San Jose, Calif.

[22] Filed: Nov. 12, 1971

[21] Appl. No.: 198,363

[52] U.S. Cl. ............... 156/583, 219/243, 100/93 P
[51] Int. Cl. ... B32b 31/00, H05b 1/00, B30b 15/34
[58] Field of Search ........................... 156/583, 580; 219/243; 338/316; 100/93 P

[56] References Cited
UNITED STATES PATENTS
2,589,756  3/1952  Waters ............................ 100/93 P
2,663,353  12/1953  Rohdin ............................ 100/93 P Primary Examiner—Douglas J. Drummond
Attorney—F. W. Anderson et al.

[57] ABSTRACT

A heat sealing head eliminates the detrimental effects of thermal expansion by providing a construction accommodating longitudinal expansion and minimizing the effects of lateral expansion. A heater element is held to a sealing bar by spaced spring biased clamp blocks. Intermediate the clamp blocks, support bars cover the heater and are resiliently clamped to the sealing bar. A central post of each support bar connects to a rigid support beam which reciprocates to actuate the sealing bar. The heater element expands linearly under its clamp blocks, and the support bars expand linearly between the clamp blocks, thus eliminating warping stress and maintaining the active face of the sealing bar flat for optimum sealing, and in the illustrated embodiment, parallel to an oppositely disposed cooperating sealing bar having the same construction.

7 Claims, 6 Drawing Figures

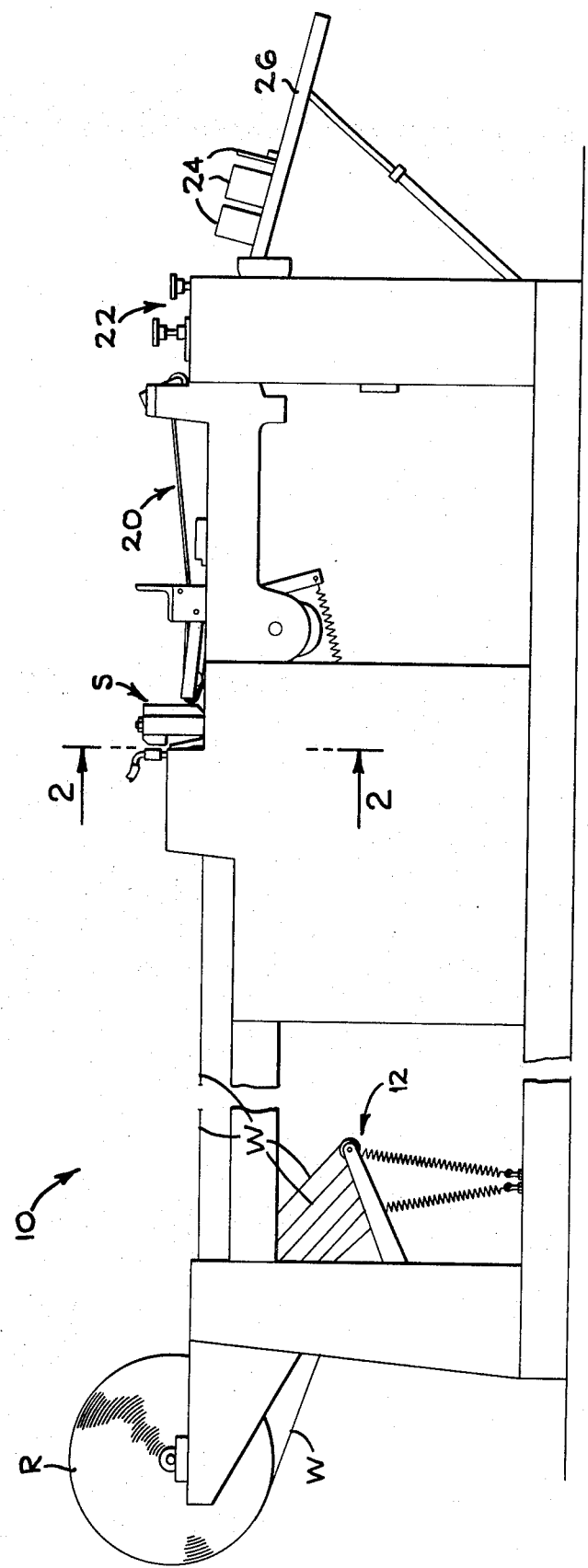

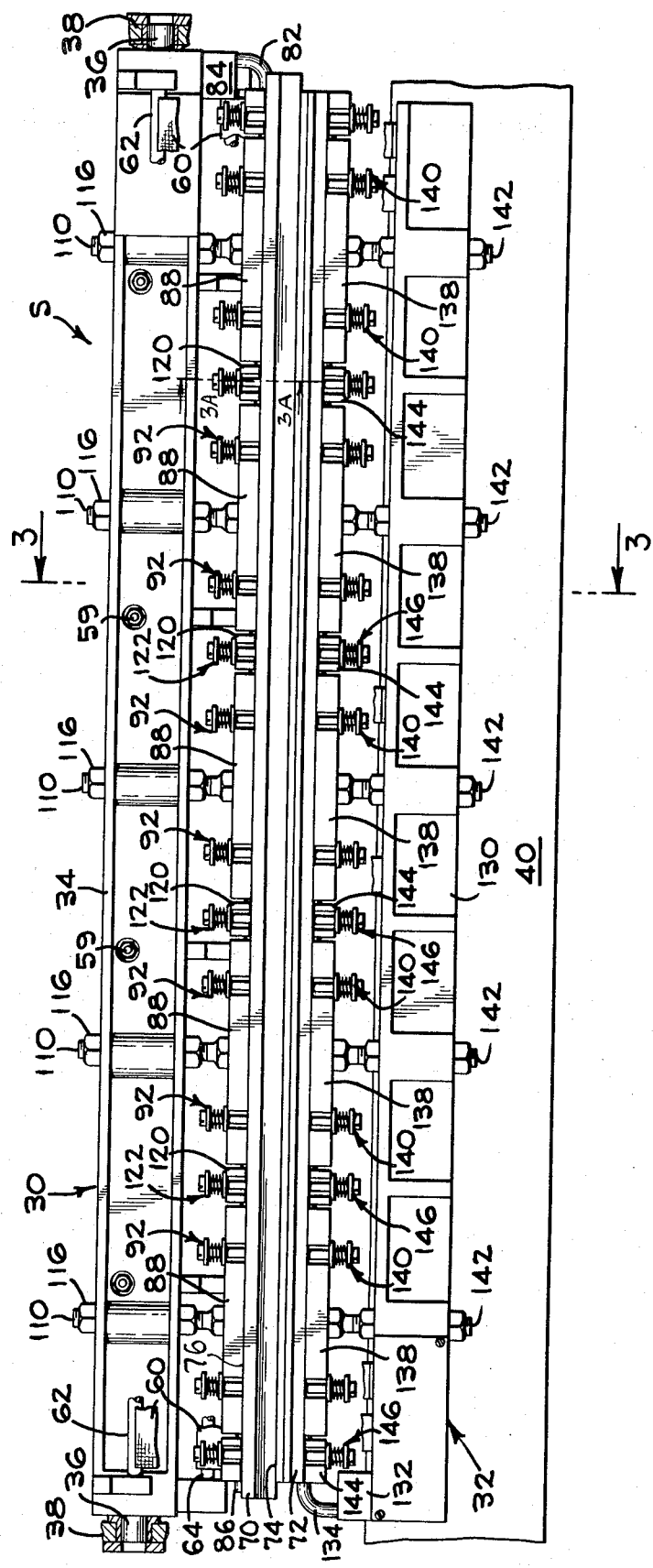

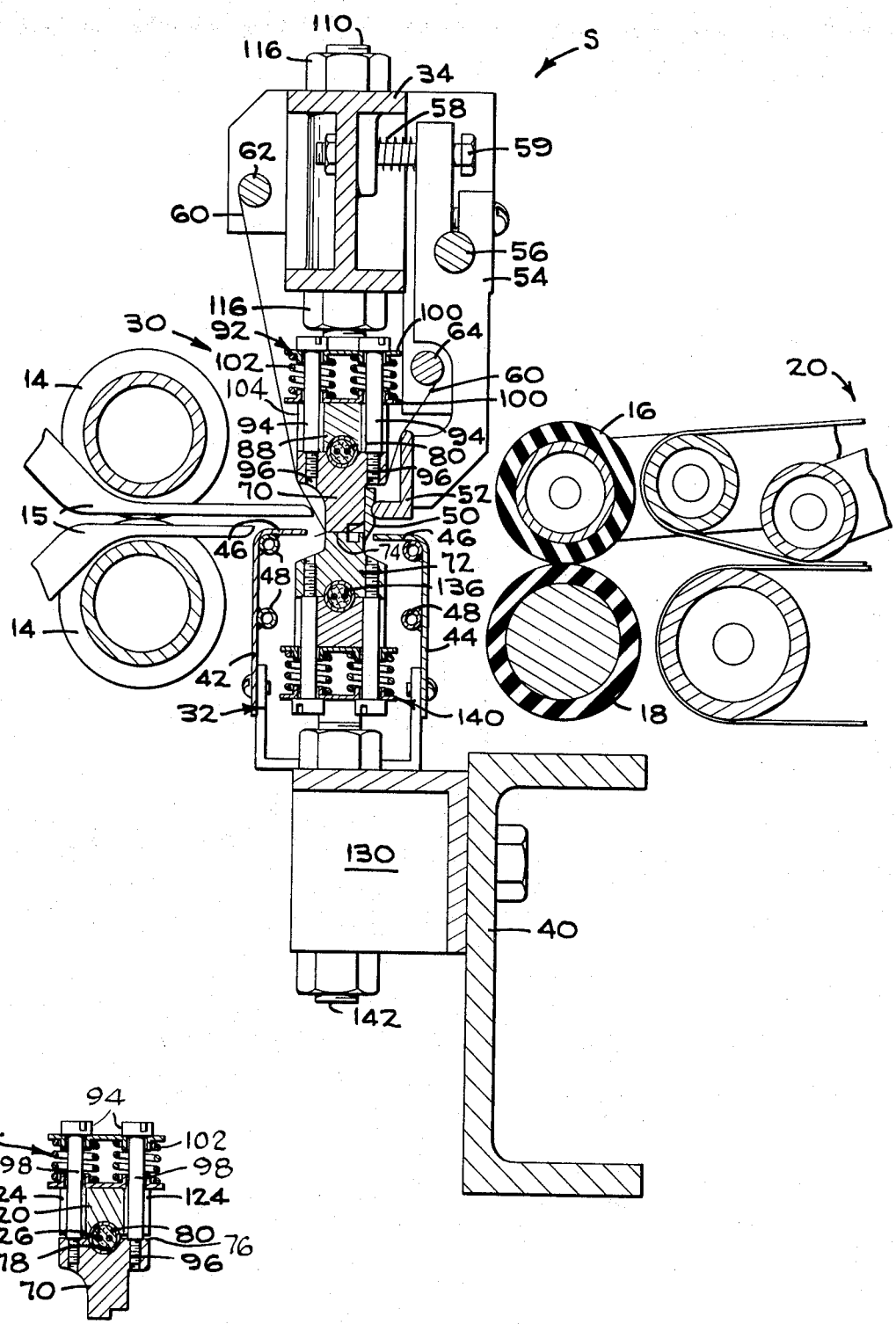

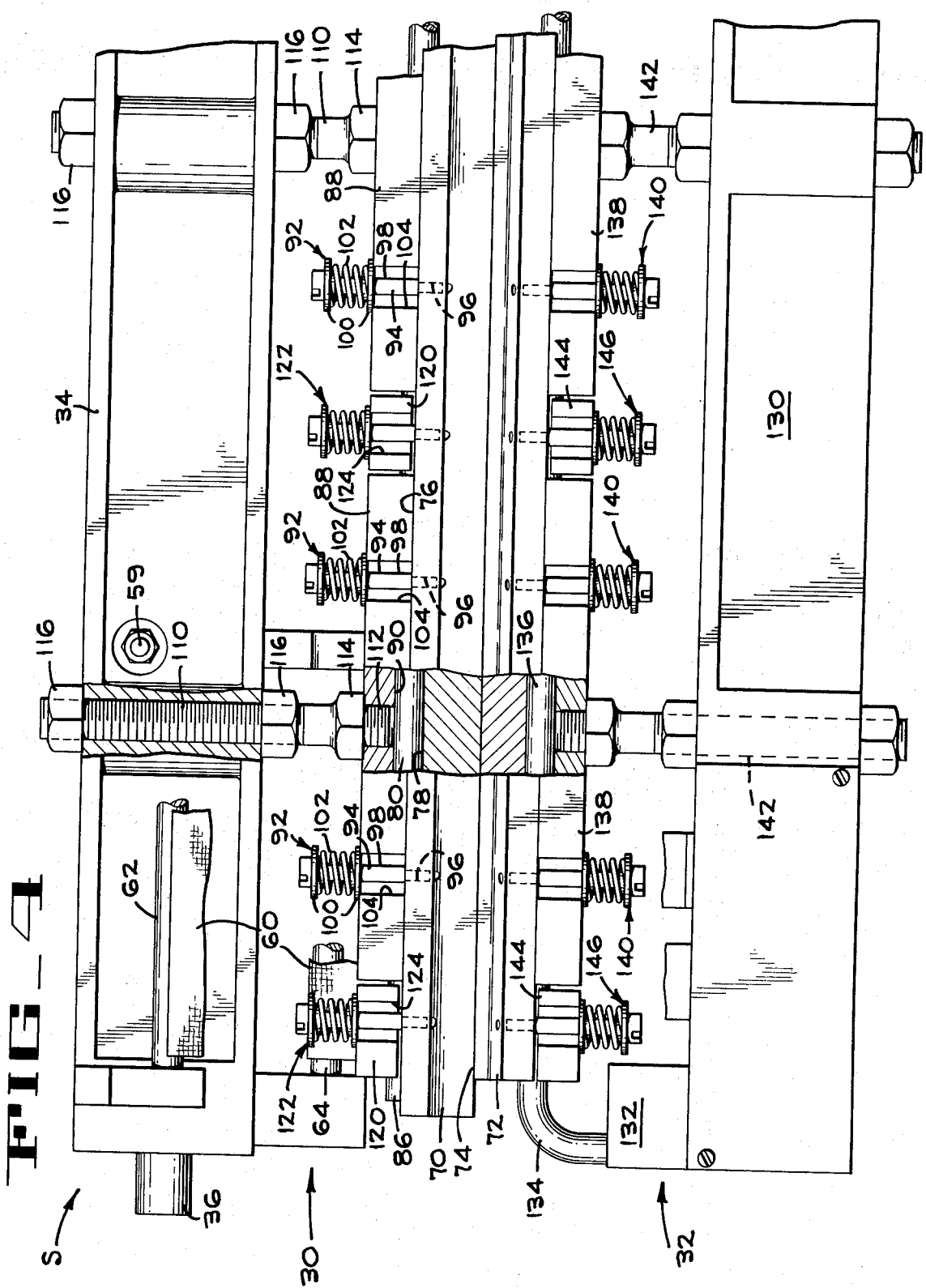

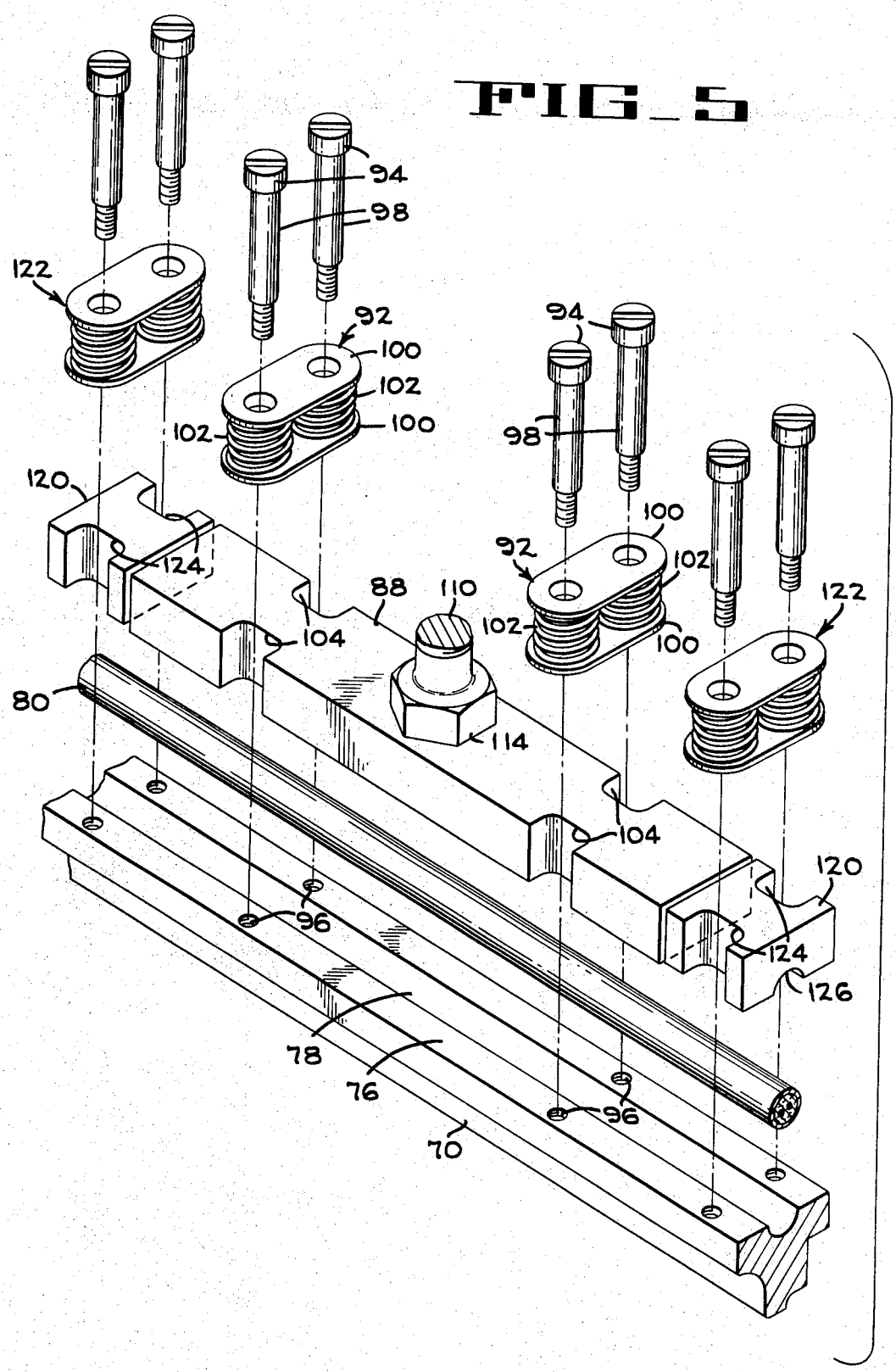

3,779,838

HEAT SEALING HEAD

BACKGROUND OF THE INVENTION

The present invention pertains to heat sealing heads of the type used to bond or weld, and sometimes also sever, heat sealable film webs in bag making machines and the like.

Prior art heat sealing heads are generally of two distinct types, one in which the sealing bar is formed in two pieces to install or remove a tubular heating element, and another in which the sealing bar is provided with an oversize hole to receive the heating element. The two piece arrangement provides for good heat transfer, but the necessary assembly bolts often corrode in place and either break in removal or make the removal time consuming. The one piece, bored sealing bar has less efficient heat transfer and allows the heating element to vibrate when the sealing head is operating.

Both types of sealing heads may use either a rigid support without adjustment between the sealing bar and the support, or in some cases adjustment means are provided to straighten the sealing bar. With either the non-adjustable or adjustable supports, the assembly when heated causes internal stress, and repeated stress will eventually warp the sealing bar to such a degree that uniform sealing pressure cannot be had along the length of the bar. These stresses are caused by temperature gradients in the assembly due to non-uniform cross sections, heat loss during sealing, by the different coefficients of expansion among the various parts of dissimilar metals, and other factors. In any case, the stresses usually result in warpage, and repeated warpage can accumulate enough stress to cause relative motion among the parts, with the inevitable result that the sealing bar will not function efficiently because of the warping previously noted.

If the sealing bar assembly has adjustment provisions for straightening the bar, an obvious solution to restore the bar to its original efficiency is to straighten the bar while it is at operating temperature. This is only a partial solution, however, when the operating conditions require periodic changes in web materials having different sealing temperatures. An indication of the severity of the problem is that some users leave the sealing bar heaters on continuously - even when the machine is not operating - in order to avoid warpage of the sealing bar assembly when the assembly is heated from a cold condition. As far as is known, no present sealing bar designs have recognized and solved the above noted disadvantages; it has apparently been assumed that the inconvenience of repeated adjustment of the sealing bar assembly is a disadvantage which cannot be easily remedied.

SUMMARY OF THE INVENTION

Basic aspects of the present invention are mechanical and dimensional provisions which allow thermal expansion of the various dissimilar metals in a heat sealing head without adversely affecting the operating efficiency of one another, that is, without causing internal stress which can cause warpage of the sealing bar. These provisions are effective to maintain the sealing bar unstressed, and thus in its original straight condition with a flat sealing surface, when the assembly is either at operating temperature, or cold.

BRIEF DESCRIPTION OF THE DRAWINGS

FIG. 1 is a diagrammatic side elevation of a typical bag making machine incorporating the improved heat sealing head of the present invention.

FIG. 2 is an enlarged fragmentary section taken along lines 2—2 on FIG. 1.

FIG. 3 is an enlarged section taken along lines 3—3 on FIG. 2.

FIG. 3A is a fragmentary portion of FIG. 3 taken along a slightly different section plane.

FIG. 4 is an enlarged view, partly broken away, of the left end portion of FIG. 2.

FIG. 5 is an exploded isometric of part of the apparatus shown in FIG. 4.

DESCRIPTION OF THE PREFERRED EMBODIMENT

One known type of bag making machine in which the present invention is useful is a bottom seal bag machine 10 (FIG. 1) which produces film bags by transversely sealing and severing a heat sealable web. A web W is fed from a supply roll R in tube form, either gusseted ro ungusseted, in which the upper and lower sections eventually become the front and back panels of the bag, with the closed edges of the unsevered web providing continuous bag sides having no seals. Fed through a dancer roll assembly 12 for providing uniform web tension, grooved downstream draw rolls 14, (FIG. 3) cooperating with stripper or guide fingers 15, intermittently advance one bag length of web to a vertically reciprocable sealing head mechanism S which transversely seals and severs the web, thus forming one complete bag with every two adjacent sealing and severing operations.

Downstream of the sealing head mechanism S, FIG. 3) a movable upper draw roll 16 and a fixed draw roll 18 grip, tension and convey the bag issuing from the sealing head mechanism S and deliver it to a belt conveyor 20. From conveyor 20, the bags move through a corrugating station at 22 and are ejected therefrom into an enclosure formed of adjustable stop plates 24 on a stacking table 26, the bags thus accumulating in stacks for packing or other handling. All of the above-identified elements except the sealing head mechanism S are either conventional and known in the prior art, or are disclosed in the pending patent application of Wech, Ser. No. 760,048, now U.S. Pat. No. 3,663,338, May 16, 1972, which application is assigned to the assignee of the present invention and discloses the overall bag making apparatus.

The sealing head mechanism S (FIG. 2) of th present invention includes a reciprocating sealing head assembly 30 and a stationary anvil assembly 32. Each assembly 30 and 32 incorporates the subject matter of the present invention, namely, a particular structural and dimensional arrangement which assures that the heat employed in each assembly does not cause the thermal stress which could either temporarily or permanently deform or warp those surfaces which contact and seal the web. Practice of the invention does not require dual heated sealing assemblies; the same advantages obtain in machines using only one sealing head assembly.

With reference to FIGS. 2 and 3, the reciprocating sealing head assembly 30 includes a rigid I-beam 34 which in a known manner is provided with end trunnions 36 which are seated in bosses 38 having associated structure, not shown, for vertically reciprocating the I-beam in timed relation to the advancement of the web through the bag machine 10. The stationary anvil assembly 32 is mounted on a channel beam 40 that is secured, by means not shown, to fixed frame members of the bag machine.

Mechanism which in the present embodiment of the invention is associated with the sealing head assemblies 30 and 32 (FIG. 3) but is not directly concerned with, or critical thereto, includes heat shields 42 and 44 having upper, web supporting flanges 46, and internal cooling tubes 48 for dissipating part of the operating heat. Similarly, the upper sealing head assembly 30 includes a non-essential web severing knife blade 50, secured to an elongate angle bar 52 that is carried by pivot brackets 54 mounted on a pivot rod 56. Each bracket 54 is biased by a spring 58 on a retaining stop bolt 59 to urge the knife blade 50 into operating position adjacent the downstream side of the sealing head assemblies 30 and 32. Further, the pivotable brackets 54 allow the knife blade to be moved away from the sealing head assemblies in order to reposition a Teflon-impregnated glass cloth curtain 60 which wraps around rotatable roller shafts 62 and 64, and extends under the upper sealing head assembly 30 to insure that the web does not adhere to the sealing head during the sealing operation.

With reference now to the structural provisions of the present invention which prevent warpage of the active web sealing surfaces, and maintain the surfaces flat for optimum sealing contact with the web, upper and lower sealing bars 70 and 72 (FIGS. 2 and 3), respectively, engage the web and the interposed Teflon-glass cloth curtain 60 along an interface 74. The upper face of the lower sealing bar 72 is covered with a teflon-glass cloth tape, which extends to the side of the knife blade 50, for the same purpose as the curtain 60. As best shown in FIGS. 4 and 5, the upper or mounting surface 76 of the sealing bar 70 is provided with a coexistensive arcuate groove 78 for receiving a tubular, electrically energized heating element 80. One end of the heating element 80 (FIG. 2) is provided with an elbow portion 82 that is rigidly held in a clamp block 84. The clamp block, in turn, is secured to the I-beam 34. The other end 86 (FIG. 4) of the heating element 80 is free. With this arrangement, thermal elongation and contraction of the heating element 80 is limited to movement of the free end 86 toward and away from the anchored elbow portion 82.

Clamped against the upper mounting surface 76 of the sealing bar 70 are several support bars 88 (FIG. 2), each of which is provided with a coexistensive arcuate groove 90 (FIG. 4) which is complementary to the groove 78 in the sealing bar. The passage formed by the grooves 78 and 90 is cylindrical and is only slightly larger than the outside diameter of the heating element 80 so that the heating element is free to radially expand without binding in the passage, and is thus free to axially expand and contract from its anchored end.

In order to provide and maintain firm engagement of the support bars 88 with the sealing bar 70 and yet accommodate thermal expansion and contraction of the support bars without affecting such engagement, the end portion of each support bar 88 is clamped to the sealing bar by a spring clamp 92. As clearly shown in FIG. 5, each spring clamp includes two shouldered bolts 94 with threaded lower ends received in threaded apertures 96 of the sealing bar.

A smooth shank 98 of each bolt 94 extends freely through two spring holder clamp plates 100 and a compression spring 102 intermediate the clamp plates. The lowermost clamp plate 100 seats upon the upper surface of the support bar, and the combined force of the springs 102 is sufficient to keep the support bar 88 in firm engagement with the sealing bar 70 as the assembly is vertically reciprocated during operation. Dimensional changes of the support bars 88 due to thermal expansion and contraction do not affect the engagement of the support bars and the sealing bar, due to the fact that each of the bolts 94 is located in a notched edge portion 104 of the associated support bar and that the notch is longer than the diameter of the bolt. Because the heating element 80 will maintain the general alignment of the support bars 88 with the sealing bar 70, the shank portions 98 of the bolts 94 are spaced from the inner walls of the notches, and thereby provide clearance for lateral expansion of the support bars.

To insure that the thermal expansion of the support bars along their major axes is unopposed by any mechanical means, each support bar 88 is provided with a single central post 110 connecting it to the I-beam 34. As has been shown in FIG. 4, each post 110 is formed with a threaded lower end 112 engaged with a threaded aperture in the support bar 88, aned is provided with an integral hexagonal head 114 for drawing it tight. The upper shank of the post is threaded for the reception of lock nuts 116 which hold the post in axially adjusted position relative to the I-beam 34. Since the post 110 is the sole connection of each support bar to the I-beam, and the latter two elements are spaced apart, conduction of heat to the I-beam is negligible and does not adversely affect its linearity.

Vibration can be damaging to the heating element 80. Accordingly, to prevent vibration but still allow the thermal expansion and contraction of the heating element, a spring biased clamp block 120 is located at each end of the support bars 88 to resiliently grip the heating element against the surface of the sealing bar slot 78. For this purpose, each clamp block 120 is gripped by a spring clamp 122 which is identical to the spring clamps 92. Further, each clamp block 120 is provided with edge notches 124 to permit thermal expansion of the block both along and across the heating element as described for the support bars 88.

As shown in FIGS. 4 and 5, each clamp block 120 is shorter than the distance between the ends of the adjacent support bars 88 for expansion clearance. The underside of each clamp block 120 (FIGS. 3A and 5) is provided with an arcuate groove 126 for engaging the heater element 80, and when so engaged, each clamp block, as shown in FIG. 4, is vertically separated from the upper surface 76 (FIG. 5) of the sealing bar 70 so that the spring clamp 122 exerts full spring force against the heater element 80 to prevent it from vibrating when the sealing head mechanism is operating, and yet allow the previously mentioned expansion and contraction of the heating element.

The sealing head assembly 32 is essentially the same as the sealing head assembly 30, but is inverted and fixed in position. Thus, the fixed channel beam 40 (FIGS. 2 and 3) rigidly supports a webbed and reinforced beam casting 130. One end of the beam 130 (FIGS. 2 and 4) carries a clamp block 132 for gripping an elbow portion 134 of a heating element 136. Support bars 138 are held against the undersurface of the sealing bar 72 by spring clamps 140, and the support bars are adjustably connected to the beam 130 by posts 142, all of which except the beam 130 are identical in form and function to the corresponding parts of the upper sealing head assembly 30, as are clamp blocks 144 and spring clamps 146.

In operation, the heating elements 80 and 136 can be energized from a cold condition without affecting the flat sealing relation of the active surfaces of the sealing bars 70 and 72 along the interface 74. Considering the upper sealing head assembly 30, as the heating element 80 brings the sealing bar 70 up to operating temperature, the heating element elongates and moves axially through the larger diameter passage formed by grooves 78 and 90 of the sealing bar and the support bars, and slides past the clamp blocks 120. Similarly, when the support bars 88 expand from the heat induced therein by the heating element, lateral expansion is accommodated by the clearance notches 104 that lie between opposed bolts 94 of the spring clamps 92. The greater degree of longitudinal expansion of the support bars 88 is provided for by the clearance spaces between the ends of the support bars and the clamp blocks 120, the clamp blocks also expanding into those clearance spaces. Both the lateral and longitudinal expansion of the sealing bar 70 is also accommodated by the clearance notches 104 without stressing any of the associated or adjacent parts.

Meanwhile, it will be noted that the heating element 80 is substantially isolated from atmosphere so that the heat loss is small, and that even though the structural arrangement provides for free thermal expansion of the parts, the heating element 80 is firmly clamped in position to prevent vibration when the sealing head assembly 30 is vertically reciprocated in operation. Further, the reciprocating I-beam 34 has minimal heat conductive paths (the posts 110) to the heated operating elements, and thus remains relatively cool and undistorted. Since all of the posts 110 are in the same relative position to the heating element 80, all posts are subject to the same degree of thermal expansion, and the active working surface of the sealing bar 70 therefore maintains its parallelism with the I-beam. It is, accordingly, evident that the above described structural provisions and the identical provisions inherent in the structure of the lower sealing head assembly 32 assure that after coextensive parallelism of the sealing bars 70 and 72 is achieved by appropriate adjustment of the posts 110 of the upper sealing head assembly 30, and by adjustment of the counterpart posts 142 of the lower sealing head assembly 32, that repeated heating and cooling of the sealing bars cannot disturb the parallelism because thermal expansion and contraction is positively prevented from causing internal stresses in the operating components. Another advantage of the described structural arrangement of the present invention is that in addition to effective heat transfer, minimal vibrations and the capability of prolonged use without adjustments, the heating elements can be removed and replaced without total disassembly or removal of the assembly bolts.

Although the best mode contemplated for carrying out the present invention has been herein shown and described, it will be apparent that modification and variation may be made without departing from what is regarded to be the subject matter of the invention.

What is claimed is:

1. A heat sealing head of the type comprising a support beam, a sealing bar assembly comprising an elongate sealing bar surrounding an electric heating element and means for mounting said sealing bar assembly on said beam; the improvement wherein said sealing bar assembly comprises a sealing bar having an elongate recess formed therein for receiving a part of said heating element, a support bar having a complementary elongate recess formed therein for receiving the remainder of said heating element, a post connecting said support bar to said beam, and means for resiliently clamping said support bar to said sealing bar for accommodating expansion of the sealing bar relative to said support bar, said heating element being somewhat loosely mounted in said recesses.

2. In a heating sealing head including a sealing bar having a heating element and a beam supporting said sealing bar, wherein thermal expansion and contraction tends to warp the sealing surface of said sealing bar, the improvement of means for preventing warpage of said sealing bar comprising an elongate support bar engaged with said sealing bar, a post connecting said support bar to said support beam, and clamp means holding each end portion of said support bar to said sealing bar to maintain interengagement of said support and sealing bars while allowing end to end and lateral thermal expansion of said support bar independent of said sealing bar, each of said clamp means including two vertically aligned clamp plates extending across said support bar, a pair of compression springs intermediate said clamp plates, and a bolt extending through each of said springs and said clamp plates with threaded engagement with said sealing bar to resiliently clamp said support bar and said sealing bar together.

3. Apparatus according to claim 2, wherein said support bar is notched to clear each of said bolts and allow unrestrained thermal expansion and contraction of said support bar.

4. A heat sealing head comprising an elongate rigid support beam reciprocable toward and away from a web to be heat sealed, an elongate heated sealing bar substantially parallel to said support beam, a plurality of spaced support bars engaged with said sealing bar and confronting said support beam, a post connecting each support bar to said support beam, and a clamp resiliently gripping each support bar to said sealing bar for maintaining the interengagement of said sealing bar and said support bars without restricting the thermal expansion of either.

5. A heat sealing head comprising an elongate rigid support beam reciprocable toward and away from a web to be heat sealed, a sealing bar substantially coextensive with said support beam, a plurality of spaced support bars engaged with said sealing bar and confronting said support beam, a post connecting each support bar to said support beam, a tubular heater loosely mounted in complementary recesses of said support bars and said sealing bar, a spring holding each support bar to said sealing bar, a clamp block intermediate adjacent support bars, and a spring holding each clamp block against said heater.

6. A heat sealing head comprising an elongate rigid support beam reciprocable toward and away from a web to be heat sealed, an elongate sealing bar substantially parallel to said support beam, a plurality of spaced support bars engaged with said sealing bar and confronting said support beam, and axially adjustable post connecting each support bar to said support beam, a tubular heater loosely gripped between said support bars and said sealing bar and having one end portion anchored to said support beam, a clamp resiliently gripping each support bar to said sealing bar, a clamp block intermediate adjacent support bars, and a clamp connected to said sealing bar and resiliently holding each clamp block against said heater.

7. A heat sealing head comprising an elongate rigid support beam reciprocable toward and away from a web to be heat sealed, a sealing bar substantially coextensive with said support beam, a plurality of spaced support bars engaged with said sealing bar and confronting said support beam, a central post connecting each support bar to said support beam, a tubular heater extending along said sealing bar and loosely mounted in complementary recesses of said support bars and said sealing bar, a heater clamp securing one end portion of said heater to said support beam, a spring clamp mounted on said sealing bar and gripping each end portion of each support to said sealing bar, a clamp block intermediate the ends of adjacent support bars and having an arcuate recessed surface engaged with said heater, and a spring clamp mounted on said sealing bar and gripping each clamp block to said heater.

* * * * *

UNITED STATES PATENT OFFICE
CERTIFICATE OF CORRECTION

PATENT NO. : 3,779,838
DATED : DECEMBER 18, 1973
INVENTOR(S) : ROBERT J. WECH

It is certified that error appears in the above-identified patent and that said Letters Patent are hereby corrected as shown below:

Column 2, line 25: change "ro" to --or--;

line 53: change "th" to --the--.

Column 3, line 14: delete "non-essential".

Column 4, line 28: change "aned" to --and--.

Column 6, line 19: change "heating" to --heat--;

line 20: after "beam" insert --for--.

Column 7, line 3: change "and" to --an--.

Signed and sealed this 29th day of April 1975.

(SEAL)
Attest:

RUTH C. MASON
Attesting Officer

C. MARSHALL DANN
Commissioner of Patents
and Trademarks